Sept. 1, 1970    L. E. BURT    3,526,873
DEVICE FOR INDICATING ABNORMAL CONDITIONS IN PNEUMATIC TIRES
Original Filed Feb. 18, 1965    2 Sheets-Sheet 1

INVENTOR
LEO E. BURT

BY *Clifton T. Hunt, Jr.*

ATTORNEY

Sept. 1, 1970  L. E. BURT  3,526,873
DEVICE FOR INDICATING ABNORMAL CONDITIONS IN PNEUMATIC TIRES
Original Filed Feb. 18, 1965  2 Sheets-Sheet 2

INVENTOR
Leo E. Burt

BY *Clifton T. Hunt, Jr.*

ATTORNEY

United States Patent Office 3,526,873
Patented Sept. 1, 1970

3,526,873
DEVICE FOR INDICATING ABNORMAL CONDITIONS IN PNEUMATIC TIRES
Leo E. Burt, Fern Park, Fla., assignor to LB Safety Devices, Inc., Greensboro, N.C., a corporation of North Carolina
Continuation of application Ser. No. 433,700, Feb. 18, 1965. This application Nov. 2, 1967, Ser. No. 686,364
Int. Cl. B60c 23/00
U.S. Cl. 340—58                         3 Claims

ABSTRACT OF THE DISCLOSURE

My invention relates generally to critical vibration level indicators and more specifically to devices for warning drivers of vehicles having pneumatic tires that an abnormal pressure condition exists as to a particular tire.

CROSS-REFERENCE TO RELATED APPLICATION

This application is a continuation of applicant's copending application Ser. No. 433,700, filed Feb. 18, 1965, now abandoned.

BACKGROUND OF THE INVENTION

Many warning devices have been designed to indicate when an abnormal pressure condition exists in a particular tire. Having been forewarned, the driver of a vehicle having such a warning device may stop the vehicle and inspect the tire indicated as having an abnormal pressure condition. The tire may then be changed before a conceivable blowout ensues which could cause a costly fire, a wreck or both. If a tire is slowly deflating, continued operation of the vehicle at the normal high rates of speed common today may render the tire casing unfit for repair.

Most of the devices known entail a direct pressure connection with the interior of the tire. This is undesirable because of the relative difficulty in providing a means for a signal to be transmitted from the rotating tire to the non-rotating chassis of the vehicle. Some devices have utilized a brush contact between the rotating and the non-rotating portions of the brake drum assembly of each wheel of the vehicle. In addition to requiring alteration of the wheel assembly, the brush contacts wear out relatively quickly. The effectiveness of the contact is also impaired by the inevitable collection of road dust and dirt. Other devices utilize rather complex and expensive equipment which includes a pressure-actuated radio transmitter mounted on each rotating tire and a radio receiver mounted in the cab of the vehicle. Still other devices utilize inductive or capacitive couplings between pressure switch circuits mounted on each rotating tire and adjacent portions of the indicating circuit mounted on the chassis of the vehicle. The use of these devices involves relatively expensive and time-consuming alteration of each wheel assembly.

One device disclosed in U.S. Letters Pat. No. 1,872,068 avoids the necessity of providing means to carry a pressure actuated signal from the rotating tire to the nonrotating chassis by utilizing a different principal of operation. Since it was known that a pneumatic tire on a moving vehicle transmitted "a force and a motion" (a vibration) to the respective axle of the vehicle which varied according to the degree of inflation of the tire, the inventor of the aforementioned device mounted "inertia rheostats" on the axles adjacent each tire of the vehicle. Each "inertia rheostat" included a pile of carbon discs which was compressed by an adjustable, resiliently movable weight. As the intensity of vibration increased, the compression of the pile increased, thereby decreasing the resistance of the rheostat. These rheostats were utilized as the four resistance of a Wheatstone bridge arrangement whereby the resistances of the rheostats associated with the tires on one side of the vehicle were compared, any imbalance being registered by an ammeter. The device as disclosed would prove to be ineffective in the event that the tires being compared were experiencing a pressure abnormality. The sensitivity of the device is in part limited by the range of resistance variation of the resistors. Use of the device as disclosed required balancing the resistances of the rheostats by making physical adjustments to the degree of compression of the rheostat piles as mounted. This balancing of necessity could be undertaken only when the vehicle having the apparatus is at rest.

It is, therefore, an object of this invention to provide an improved pressure abnormality indicating device for vehicles having pneumatic tires which avoids the necessity of providing means for a pressure-actuated signal to be transmitted from the rotating tire to the nonrotating chassis of the vehicle.

It is also an object of this invention to provide an improved pressure abnormality indicating device actuated by tire vibration which is capable of indicating pressure abnormalities in all of the tires of the vehicle at once.

It is a further object of this invention to provide an improved pressure abnormality indicating device which is relatively inexpensive to build and is easier to install on a vehicle than are the known pressure indicating devices.

It is a further object of this invention to provide a device of the character described, the sensitivity of which may be adjusted by the driver of the vehicle when the vehicle is moving.

A still further object of this invention is to provide novel and improved vibration sensing means.

Other objects and a fuller understanding of the invention may be had by referring to the claims and the accompanying drawings in which:

Apparatus embodying the invention may broadly be described as including indicating means selectively activated by the output of a vibration sensing device when the intensity of vibration of a body being monitored such as a pneumatic tire exceeds a predetermined level. It is known that if too great or too little pressure is contained within a given pneumatic tire of a moving vehicle, that tire vibrates with much greater intensity than would be experienced if the tire contained the normal operating pressure. Vibration sensing devices are therefore suitably positioned to sense the vibration intensity and, thereby, to sense an abnormal pressure condition which causes excessive vibration intensity.

Figure 1:
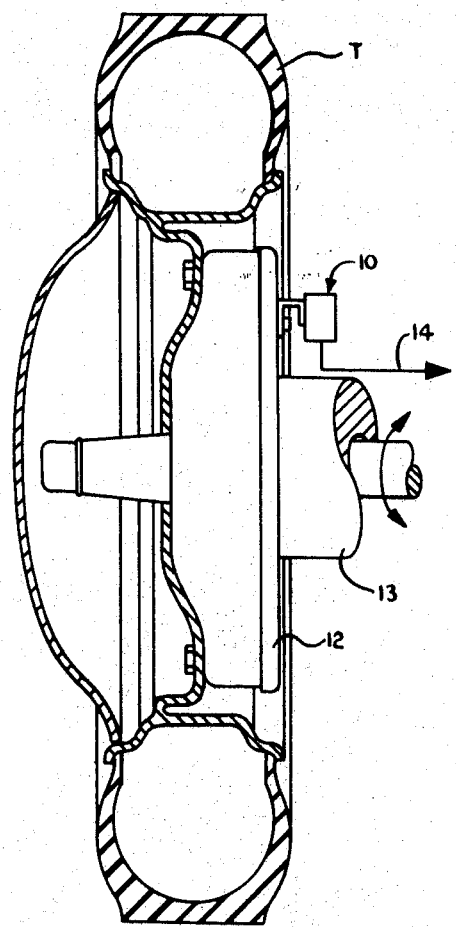
FIG. 1 is an end view, partially in section, of a vibration sensing device mounted on a wheel of a vehicle.
Figure 5:
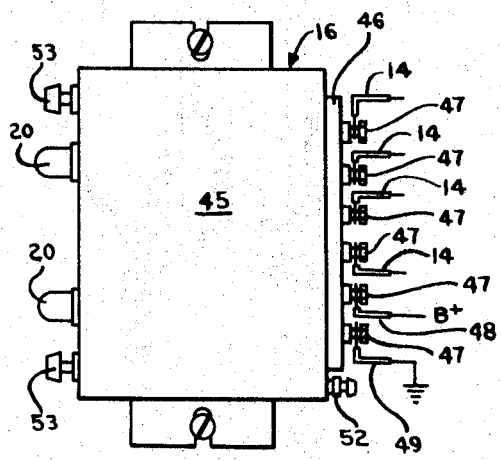
FIG. 5 is a bottom view of the indicator.
Figure 4:
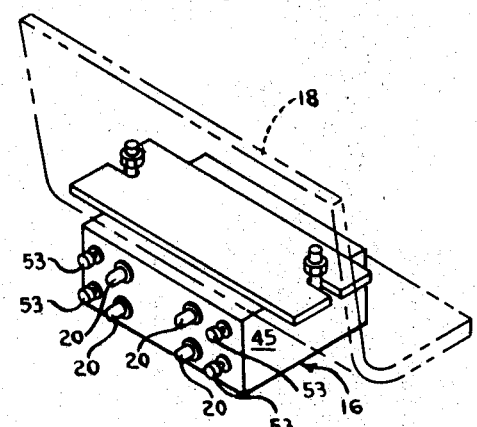
FIG. 4 is a perspective view of an indicator mounted on the dashboard of a vehicle.

A vibration sensing device 10 is suitably mounted as shown in FIG. 1 to a nonrotating portion 12 of the brake drum housing of each tire T of a vehicle desired to be monitored. Alternatively, the sensing device 10 may be mounted on the nonrotating axle housing 13 or other portion of the vehicle chassis adjacent each wheel to be monitored. An electrical output lead 14 extends from each sensing device 10 and is electrically connected as shown in FIG. 5 to a respective input connector 47 mounted on an insulated board 46 which is secured to the back of the housing 45 of an alarm device or indicator 16. The indicator 16 is appropriately mounted in the cab of the vehicle such as beneath the dashboard 18 as shown in FIG. 4.

Figure 2:
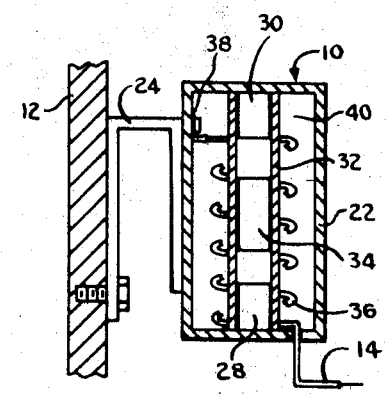
FIG. 2 is a schematic sectional view of the vibration sensing device of FIG. 1.

The vibration sensing device 10, schematically shown in FIG. 2, broadly comprises a generator whose electrical output varies with the intensity of vibration to which it is subjected. More specifically, the device 10 comprises a magnet and a coil of wire arranged for relative movement. This relative movement tends to impress a voltage over the coil of wire and, thereby induce a current flow through the wire.

Referring to FIG. 2, the device 10 includes a housing 22 which is suitably secured as by a bracket 24 to the nonrotating portion 12 of the brake drum housing. A vertically disposed sleeve 32 extends between the upper and lower walls of housing 22, and magnets are mounted in the sleeve in fixed spaced relation to each other. The distal ends of the magnets are secured to the top and bottom walls of the housing 22, and the spaced apart proximal ends are of opposite polarity. A movable magnet 34 is reciprocally confined in the sleeve 32 for axial movement between the proximate ends of stationary magnets 28, 30, the poles of magnet 34 being positioned adjacent poles of like polarity so that magnet 34 is repelled in both directions.

A coil of insulated wire 36, schematically shown as having only a few turns from which portions are broken away for calrity, is disposed about the sleeve 32. One end of the coil 36 is suitably grounded as by connection to bracket 24 by a bolt 38. The output lead 14 extends from the other end of the coil 36. The space 40 intermediate the coil 36 and the housing 22 is filled with rosin to prevent movement of the coil relative to the housing and to inhibit accidental disconnection or breakage of the coil.

When the housing 22 is at rest, the magnet 34 is magnetically supported between the magnets 28 and 30. When the housing 22 moves downwardly, as a result of tire vibration, the magnet 34 is repelled downwardly by magnet 30 to a position where it is repelled upwardly by magnet 28. As the intensity of vibration of the housing 22 increases, the magnet 34 moves a greater distance in the sleeve 32 relative to the coil 36, thereby increasing the intensity of the voltage impressed over the coil 36.

The sensing device disclosed is capable of a longer life in the use of contemplated than are the commercially available vibration sensing devices, for there is no resilient supporting member for the magnet which may wear out or break under the sometimes severe amounts of vibration experienced by the pneumatic tires of a vehicle..

Figure 3:
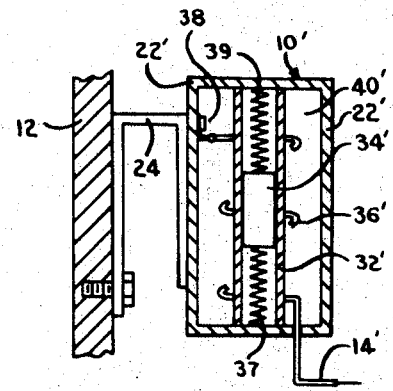
FIG. 3 is a schematic sectional view of a modified form of vibration sensing device.

The modified form 10' of the sensing device 10 shown in FIG. 3 is also thought to be an improvement over the commercially available vibration sensing devices. The device 10' is exactly like the sensing device 10 of FIG. 2 except that the magnets 28, 30 which magnetically support the magnet 34 of the device 10 are replaced by coil springs 37, 39. The device 10' includes a housing 22' and an output lead 14'. Each of the springs 37, 39 is positioned within the sleeve 32' and has one end positioned adjacent the housing 22' and the other end positioned adjacent a respective proximal pole of the magnet 34'. The magnet 34' is thereby positioned between the springs 37, 39 and is adapted for axial, reciprocatory movement in the sleeve 32' relative to the coil 36' in response to vibratory movement of the wheel with which the device is associated.

Referring to the indicator 16 shown in FIG. 5, a positive lead 48 and a negative lead 49 are electrically connected to respective input connectors 47. The leads 48 and 49 extend respectively from the positive pole and the negative pole of the battery of the vehicle (not shown) thereby supplying the indicator with electrical power. A cartridge fuseholder 52 is also mounted on the back of the indicator housing 45. Extending from the front of the indicator housing 45 are indicator sets including an indicator light 20 and a sensitivity control knob 53, one set for each wheel of the vehicle to be monitored.

Figure 6:
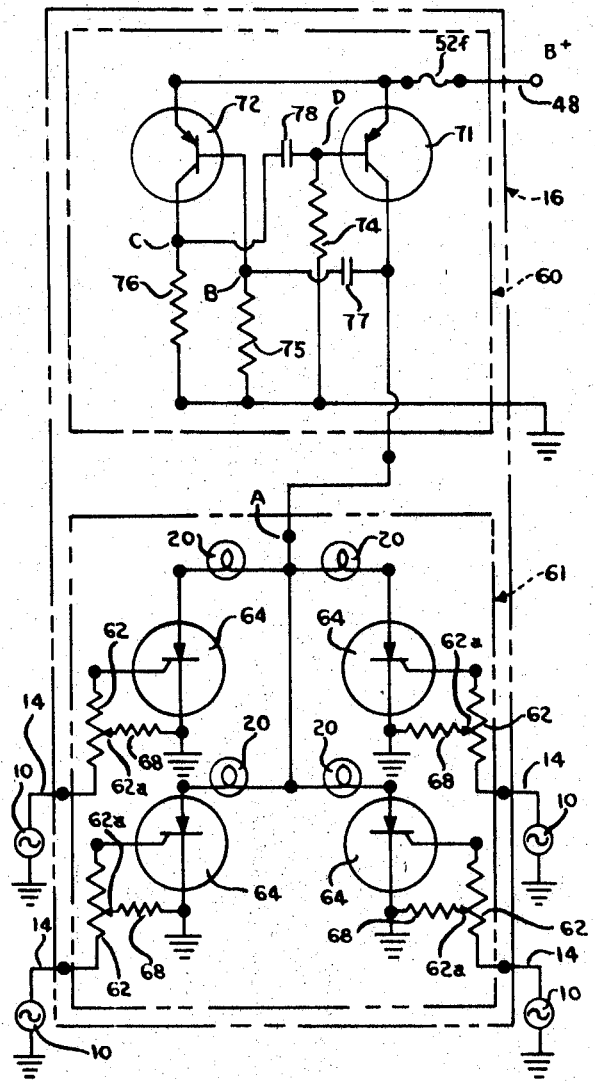
FIG. 6 is a schematic circuit diagram of a vibration intensity warning apparatus.

The electrical circuit within the indicator 16 is schematically disclosed in FIG. 6. The circuit includes a source of voltage, the output of which is fed into an indicator light circuit 61 at point A. The indicator light circuit 61 comprises an arrangement of a number of identical subcircuits electrically connetced in parallel to point A, one subcircuit for each of the wheels of the vehicle to be monitored. A description of the arrangement and the operation of one of the said subcircuits will, therefore, adequately describe the entire indicator light circuit 61.

The output of a sensing device 10 is fed through the output lead 14, the respective input connector 47, and a 10K ohm potentiometer 62 to the gate of a silicon control rectifier 64 of the type designated 2N2322. An incandescent lamp or light 20 is electrically disposed between the point A of the indicator light circuit 61 and the anode of the silicon control rectifier 64. A 680 ohm resistor 68 is electrically disposed between a sweep arm 62a of the potentiometer 62 and the collector of the transistor 64. The emitter of the silicon control rectifier 64 is also elecrtically connected to ground. The sweep arm 62a of the potentiometer 62 is so mechanically linked to a respective sensitivity control knob 53 that the position of the sweep arm may be altered by turning the control knob.

Basically, the subcircuit functions as an electrical switch which assumes an electrically conducting state in response to an electrical output from the sensing device 10, which output is of an intensity equal to or greater than the actuation level of the switch. The actuation level is selectively increased or decreased by turning the sensitivity control knob 53 to adjust the position of the sweep arm 62a. Since one side of the light 20 is electrically connected to an appropriate power supply, the light illuminates as soon as a conduction path through the transistor switch to ground is provided. When the intensity of the output of the sensing device 10 drops below the actuation level for the transistor 64, thereby biasing the transistor to enter the nonconducting state, the electronic switch is figuratively opened and the light 20 is extinguished.

Therefore, when one or more tires or wheels being monitored are vibrating at an intensity which is sufficient to cause the appropriate sensing device 10 to emit an output of an intensity which for the existing adjustment of the potentiometer 62 will cause its respective transistor 64 to enter a state of conduction, the appropriate indicating light or lights 20 will be illuminated. The driver is thereby warned that an abnormal pressure condition exists in one or more specific tires or wheels which are being monitored. He may then stop the vehicle and inspect those tires.

It is well known that the attention of a driver is more quickly attracted by a flashing light than by a constantly illuminated light. Therefore, in the preferred embodiment of my apparatus, a pulsating power supply is provided by feeding the voltage of the battery of the vehicle into a pulse forming network. A relatively inexpensive such network designated 60 in FIG. 6 has been found to operate quite satisfactorily.

In combination with a subcircuit of the indicator light circuit 61 wherein the appropriate transistor 64 is in a state of conduction, the pulse forming network 60 basically comprises an astable multivibrator. The emitters of p-n-p type transistors 71, 72 of the respective types 2N1360 and 2N241A are electrically connected with the positive lead 48 from the battery through a fuse 52f disposed within the fuseholder 52. A 100 microfarad capacitor 78 is electrically disposed between the base of transistor 71 and the collector of transistor 72. The base of transistor 71 is also electrically connected at point D with a 1.2K ohm resistor 74 which in turn is electrically connected to ground. A 10 microfarad capacitor 77 is electrically disposed between the base of transistor 72 and the collector of transistor 71. The base of transistor 72 is electrically connected at point B to a 15K ohm resistor 75 which in turn is electrically connected to ground. The collector of transistor 72 is electrically connected at point C to a 1.2K ohm resistor 76 which in turn is connected to ground. The collector of transistor 71 is electrically connected to the point A of the indicator light circuit 61. The operation of the astable multivibrator is conventional, the transistor 72 having been first caused to enter a state of nonconduction by the sudden conduction of transistor 71 in response to closure of the electronic switch of the indicator light circuit 61. The duration of the flash of illumination from the light 20 and the length of time in between successive pulses is, of course, dependent upon the charateceristics of the transistors used and the respective sizes of the resistance and capacitance elements in the circuit. For this circuit utilizing elements of the values disclosed, the flash rate is about four or five per second.

Figure 7:
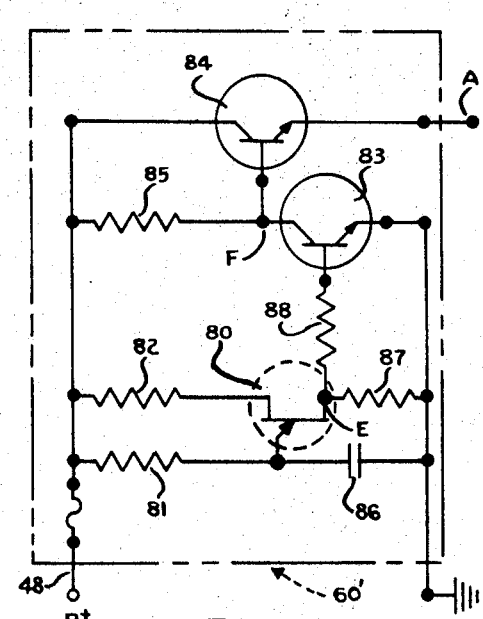
FIG. 7 is a schematic circuit diagram of a modified form of pulse-forming network.

The schematic circuit diagram of a satisfactory but more expensive modified form of a pulse-forming network 60' having a more precise flash rate is disclosed in FIG. 7. The base of a unijunction transistor 80 of the type designated 2N1671A is electrically connected to the positive lead 48 from the battery through a 56K ohm resistor 81, while the collector of said transistor is electrically connected to said lead through a 150 ohm resistor 82. The collector of a transistor 83 of the type designated as 2N214 and the base of a transistor 84 of the type designated as 15104 are electrically connected to each other at point F and are both electrically connected through a 180 ohm resistor 85 to the positive lead 48. A 10 microfarad capacitor 86 is electrically disposed between the base of transistor 80 and ground, and a 47 ohm resistor 87 is electrically disposed between the emitter of said transistor at point E and ground. The emitter of transistor 80 and the base of transistor 83 are electrically connected through a 100 ohm resistor 88 to each other. The emitter of transistor 83 is electrically connected to ground, while the emitter of transistor 84 is electrically connected to the point A of the indicator light circuit 61 (not shown in FIG. 7). The network operates conventionally to provide a pulsating voltage at point A. For the above described circuit wherein the suggested elements are utilized, the flash rate is approximately five flashes per second.

Figure 8:
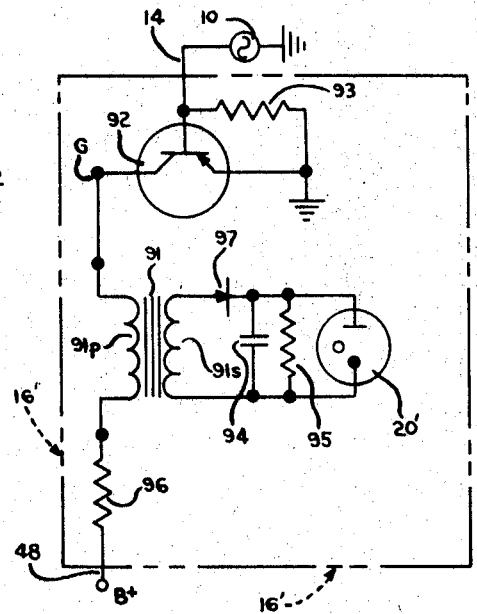
FIG. 8 is a schematic circuit diagram of a modified form of vibration intensity warning apparatus.

A schematic circuit diagram of a modified form of indicator 16' is disclosed in FIG. 8. If it is desired that a specific wheel be independently indicated as undergoing an excessive vibration one circuit like that disclosed is necessary for each body or wheel to be monitored. The indicator 16' utilizes a neon lamp 20' of the type designated NE-51 which ionizes at a peak voltage of 65 volts instead of an incandescent lamp 20 as used in the preferred form of apparatus.

One lead of the primary side 91p of a step-up transformer 91 of the type designated as a Knight #61G410 is electrically connected through a 51 ohm resistor 90 to the positive lead 48 from the battery. The other lead from the primary side 91p of the transformer 91 is electrically connected at point G to the collector of a transistor 92 of the type designated as a 2N396. The emitter of transistor 92 is electrically connected to ground, while the base of said transistor is electrically connected both to the output lead 14 from the sensing device 10 and to ground through a 20K ohm resistor 93.

The secondary circuit is conventional for discharge lamps. A one-tenth microfared capacitor 94, a 20K ohm resistor 95, and the neon lamp 20' are electrically connected in parallel; and the resulting combination is electrically connected in series with a semiconductor diode 97 of the type designated 1N540 and the secondary side 91s of the transformer 91.

The circuit 16' may be described as operating in the following manner: the transistor 92 functions as an electronic switch which is disposed between point G and ground, which switch assumes a state of conduction in response to the output of the sensing device 10 whenever the intensity of the vibration of the device 10 equals or exceeds a certain level. When the transistor 92 enters a state of conduction, a current which increases in intensity up to the stability intensity begins to flow from the battery, through the resistor 90, through the primary side 91p of the transformer 91, and through the conducting transistor 92 to ground. This increasing current induces a stepped up voltage in the secondary side 91s of the transformer 91, which voltage is impressed across the capacitor 94 and more slowly dissipated through the resistor 95. When the voltage across the capacitor 94 exceeds the ionization voltage of the lamp 20', the lamp is illuminated and a major portion of the current is shunted through the lamp. The diode 97 permits the current in the secondary circuit to flow in one direction only. When the current in the primary circuit stops increasing, the voltage induced on the secondary side drops to zero and the lamp 20' is extinguished.

When the intensity of the output of the sensing device drops below that necessary to bias the transistor 92 into a conducting state, the transistor ceases to conduct and may be visualized as an open switch between point G and ground. The next output pulse from the sensing device, if of sufficient magnitude, will cause the transistor 92 to again enter a state of conduction, and the above indicated process will reoccur. The flash rate of this circuit is a function of the frequency of vibration sensed by the sensing device 10.

Having installed the indicator 16 and having mounted the sensing devices so as to monitor the wheels of the vehicle, the apparatus may be adjusted to the desired level of sensitivity in the following manner. The tires of the vehicle are inflated to their normal operating pressure. The vehicle is then driven at the normal operating speed while the sensitivity control knobs 53 are so adjusted that the lights are illuminated. Then each knob 53 is selectively adjusted until the corresponding light 20 is extinguished. When a pressure abnormality occurs in a particular tire, the excessive vibration of that tire causes the appropriate indicating light 20 to be illuminated in the manner disclosed.

It may be additionally noted that as the apparatus is actuated to indicate an abnormal condition by vibration of excessive intensity, extraneous vibration attributable to abnormal tire conditions other than one of abnormal pressure may actuate the apparatus. Therefore, the device is also susceptible of the use of indicating when a given monitored wheel of the vehicle is out of balance. The sensitivity of the apparatus is adjusted as above after the wheels have been balanced. Thereafter, when a particular wheel becomes unbalanced, the driver may be warned by the device to have the wheel balanced and thereby avoid undesirable nonuniform tire wear attributable to continued operation in an unbalanced condition. Of course, the apparatus is operable to indicate both wheel imbalance and pressure abnormalities. If the vehicle is to be operated with one or more unbalanced wheels, the vibration component attributable to an unbalanced wheel may be damped out by so adjusting the appropriate sensitivity control knob as to cause the corresponding indicator light 20 to be extinguished, the tire having been inflated to the normal operating pressure.

In the drawings and specifications there have been set forth preferred embodiments of the invention and, although specific terms are employed, they are used in a generic and descriptive sense only and not for pur-

I claim:
1. Apparatus to indicate abnormal tire conditions existing in the tires of the rotating wheels of a moving vehicle having a voltage supply, including:
 (a) generating means mounted on a nonrotating portion of said vehicle adjacent each of said wheels of said vehicle responsive to abnormal conditions such as increased pressure and tire imbalance present in the corresponding tire to produce an electrical output which varies in intensity with the relative abnormality being experienced by the tire, said generating means comprising:
  (i) a housing,
  (ii) a coil of wire fixed within the housing and an electrical output lead extending therefrom,
  (iii) a fixed magnet having poles of opposite polarity arranged at each end of the coil with the proximal ends of the magnets being of opposite polarity,
  (iv) a movable magnet having ends of opposite polarity confined in variable spaced relation to the fixed magnets for axial reciprocatory movement within the coil between the fixed magnets responsive to said abnormal conditions present in the corresponding tire,
  (v) the ends of said movable magnet being disposed adjacent ends of the fixed magnets of like polarity,
 (b) indicating means operatively connected with said voltage supply of said vehicle, a pulse forming means operatively connected between said indicating means and said voltage supply to transform the voltage from said voltage supply into a pulsating voltage, and wherein said indicating means are operatively connected to said output terminal of said pulse forming means;
 (c) electronic switching means operatively connected to the output of said generating means and to said indicating means to actuate said indicating means in response to that intensity of electrical output of said generating means which corresponds to said abnormal tire condition; and
 (d) means to adjust the level of the intensity of the electrical output from said generating means required to actuate said electronic switching means.
2. Apparatus according to claim 1 which includes:
 (a) electronic switching means for each said generating means and operatively connected thereto;
 (b) a like number of indicating means operatively connected to the electronic switching means.
3. Apparatus to indicate abnormal tire conditions existing in the tires of the rotating wheels of a moving vehicle having a voltage supply, including:
 (a) generating means mounted on a nonrotating portion of said vehicle adjacent each of said wheels of said vehicle responsive to abnormal conditions such as increased pressure and tire imbalance present in the corresponding tire to produce an electrical output which varies in intensity with the relative abnormality being experienced by the tire;
 (b) indicating means operatively connected with said voltage supply of said vehicle, a pulse forming means operatively connected between said indicating means and said voltage supply to transform the voltage from said voltage supply into a pulsating voltage, and wherein said indicating means are operatively connected to the output of said pulse forming means;
 (c) electronic switching means operatively connected to the output of said generating means and to said indicating means to actuate said indicating means in response to that intensity of electrical output of said generating means which corresponds to said abnormal tire condition; and
 (d) means to adjust the level of the intensity of the electrical output from said generating means required to actuate said electronic switching means.

References Cited

UNITED STATES PATENTS

| | | | |
|---|---|---|---|
| 1,872,068 | 8/1932 | Brown | 340—58 |
| 2,316,616 | 4/1943 | Powell | 73—71.2 X |
| 2,720,638 | 10/1955 | Ritch | 340—58 |
| 3,129,347 | 4/1964 | Tognola | 73—71.2 X |

ALVIN H. WARING, Primary Examiner

U.S. Cl. X.R.

340—261; 200—61.22